(12) United States Patent
Gozalvez-Serrano et al.

(10) Patent No.: US 10,231,101 B2
(45) Date of Patent: Mar. 12, 2019

(54) COMMUNICATION DEVICE AND METHOD FOR V2X COMMUNICATION

(71) Applicants: Huawei Technologies Co., Ltd., Shenzhen (CN); BAYERISCHE MOTOREN WERKE AKTIENGESELLSCHAFT, Munich (DE)

(72) Inventors: David Gozalvez-Serrano, Munich (DE); Mladen Botsov, Munich (DE); Liang Hu, Shenzhen (CN); Markus Martin Dillinger, Munich (DE)

(73) Assignees: Huawei Technologies Co., Ltd., Shenzhen (CN); BAYERISCHE MOTOREN WERKE AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/917,380

(22) Filed: Mar. 9, 2018

(65) Prior Publication Data
US 2018/0199174 A1    Jul. 12, 2018

Related U.S. Application Data

(63) Continuation of application No. PCT/EP2015/070843, filed on Sep. 11, 2015.

(51) Int. Cl.
*H04W 72/12*    (2009.01)
*H04W 4/46*    (2018.01)
(Continued)

(52) U.S. Cl.
CPC ............. *H04W 4/46* (2018.02); *G08G 1/161* (2013.01); *H04W 4/44* (2018.02); *H04W 72/121* (2013.01)

(58) Field of Classification Search
CPC . H04W 72/0426; H04W 76/15; H04W 72/12; H04W 4/46
(Continued)

(56) References Cited

U.S. PATENT DOCUMENTS 6,985,089 B2    1/2006  Liu et al.
8,130,654 B2    3/2012  Garcia-Luna-Aceves et al.
(Continued)

FOREIGN PATENT DOCUMENTS

CN    103501543 A    1/2014
WO    2012168135 A1    12/2012
(Continued)

OTHER PUBLICATIONS

"On Metric and Procedures for In/Out of NW coverage detection for D2D," 3GPP TSG RAN WG1 Meeting #76bis, Shenzhen, China, XP050813562, 3rd Generation Partnership Project, Valbonne, France (Mar. 31-Apr. 4, 2014).
(Continued)

*Primary Examiner* — John J Lee
(74) *Attorney, Agent, or Firm* — Leydig, Voit & Mayer, Ltd.

(57) ABSTRACT

The invention relates to a communication device (101*a*, 107) configured to receive context information and to configure a radio frame, in particular a control channel of a radio frame, based on the context information. In an embodiment the radio frame comprises a plurality of communication resources, wherein the communication device (107) is configured to configure the radio frame by allocating at least two groups of communication resources of the plurality of communication resources of the radio frame to at least two groups of communication devices of a plurality of other communication devices (101*a-c*, 103*a-c*) based on the context information.

20 Claims, 12 Drawing Sheets

(51) Int. Cl.
*H04W 4/44* (2018.01)
*G08G 1/16* (2006.01)

(58) Field of Classification Search
USPC .................. 455/452.1, 509, 515, 456.1, 434
See application file for complete search history.

(56) References Cited

U.S. PATENT DOCUMENTS

| | | | |
|---|---|---|---|
| 8,331,346 | B2 | 12/2012 | Solis et al. |
| 2005/0037767 | A1* | 2/2005 | Kim .................. H04L 29/06 455/450 |
| 2009/0154379 | A1 | 6/2009 | Hayashi et al. |
| 2012/0064820 | A1* | 3/2012 | Bemmel .............. G08G 1/0141 455/3.02 |
| 2012/0134336 | A1 | 5/2012 | Nakaya et al. |
| 2017/0251486 | A1 | 8/2017 | Hu et al. |

FOREIGN PATENT DOCUMENTS

| | | |
|---|---|---|
| WO | 2013169974 A1 | 11/2013 |
| WO | 2014173429 A1 | 10/2014 |
| WO | 2015032436 A1 | 3/2015 |

OTHER PUBLICATIONS

Liu et al., "CA-MAC: A Hybrid Context-aware MAC Protocol for Wireless Body Area Networks," 2011 IEEE 13th International Conference on e-Health Networking, Applications and Services, 3rd Generation Partnership Project, Valbonne, France (Jun. 2011).

Bohm et al., "Context-Aware Retransmission Scheme for Increased Reliability in Platooning Applications," 6th International Workshop Nets4Cars/Nets4Trains/Nets4Aircraft 2014 Offenburg, Germany, (May 6-7, 2014).

Zhang et al., "Reliable Broadcast in Vehicular Ad-Hoc Networks," 2013 IEEE, Wireless Communications and Mobile Computing Conference (IWCMC), Institute of Electrical and Electronics Engineers, New York, New York (2013).

"Intelligent Transport Systems (ITS); Vehicular Communications; Basic Set of Applications; Definitions.," ETSI TR 102 638 V1.1.1, European Telecommunications Standards Institute, Sophia Antipolis Cedex, France (Jun. 2009).

Strom "On Medium Access and Physical Layer Standards for Cooperative Intelligent Transport Systems in Europe," Proceedings of the IEEE, vol. 99, No. 7, Institute of Electrical and Electronics Engineers, New York, New York, (Jul. 2011).

Bilstrup et al., "Evaluation of the IEEE 802.11p MAC Method for Vehicle-to-Vehicle Communication," IEEE 68th Vehicular Technology Conference, Institute of Electrical and Electronics Engineers, New York, New York (Sep. 2008).

Bilstrup et al., "On the ability of the 802.11p MAC method and STDMA to support real-time vehicle-to-vehicle communication," EURASIP Journal on Wireless Communications and Networking, Hindawi Publishing Corporation (2009).

Bilstrup et al., "Scalability Issues of the MAC Methods STDMA and CSMA of IEEE 802.11p When Used in VANETs," IEEE International Conference on Communications Workshops (ICC), Institute of Electrical and Electronics Engineers, New York, New York (2010).

Subramanian et al., "Congestion control for vehicular safety: synchronous and asynchronous MAC algorithms," The Ninth ACM International Workshop on Vehicular Inter-networking, Systems and Applications, (Jun. 2012).

Verenzuela et al., "Improving Scalability of Vehicle-to-Vehicle Communication with Prediction-Based STDMA," IEEE 80th Vehicular Technology Conference, Institute of Electrical and Electronics Engineers, New York, New York, (Sep. 2014).

Aydin et al., "Deliverable D4.3 Final Report on Network-Level Solutions," Metis, ICT-317669-METIS/D4.3, Seventh Framework Programme, (Jan. 3, 2015).

"Part 11: Wireless LAN Medium Access Control (MAC) and Physical Layer (PHY) specifications Amendment 8: Medium Access Control (MAC) Quality of Service Enhancements," IEEE Std 802.11e™—2005, Institute of Electrical and Electronics Engineers, New York, New York, (Nov. 11, 2005).

"Part 11: Wireless LAN Medium Access Control(MAC) and Physical Layer(PHY) Specifications Amendment 6: Wireless Access in Vehicular Environments," IEEE Std 802.11P™—2010, Institute of Electrical and Electronics Engineers, New York, New York (Jul. 15, 2010).

"Part 11: Wireless Lan Medium Access Control (MAC) and Physical Layer (PHY) specifications High-speed Physical Layer in the 5 GHz Band," IEEE Std 802.11a-1999(R2003), Institute of Electrical and Electronics Engineers, New York, New York, (Reaffirmed Jun. 12, 2003).

\* cited by examiner

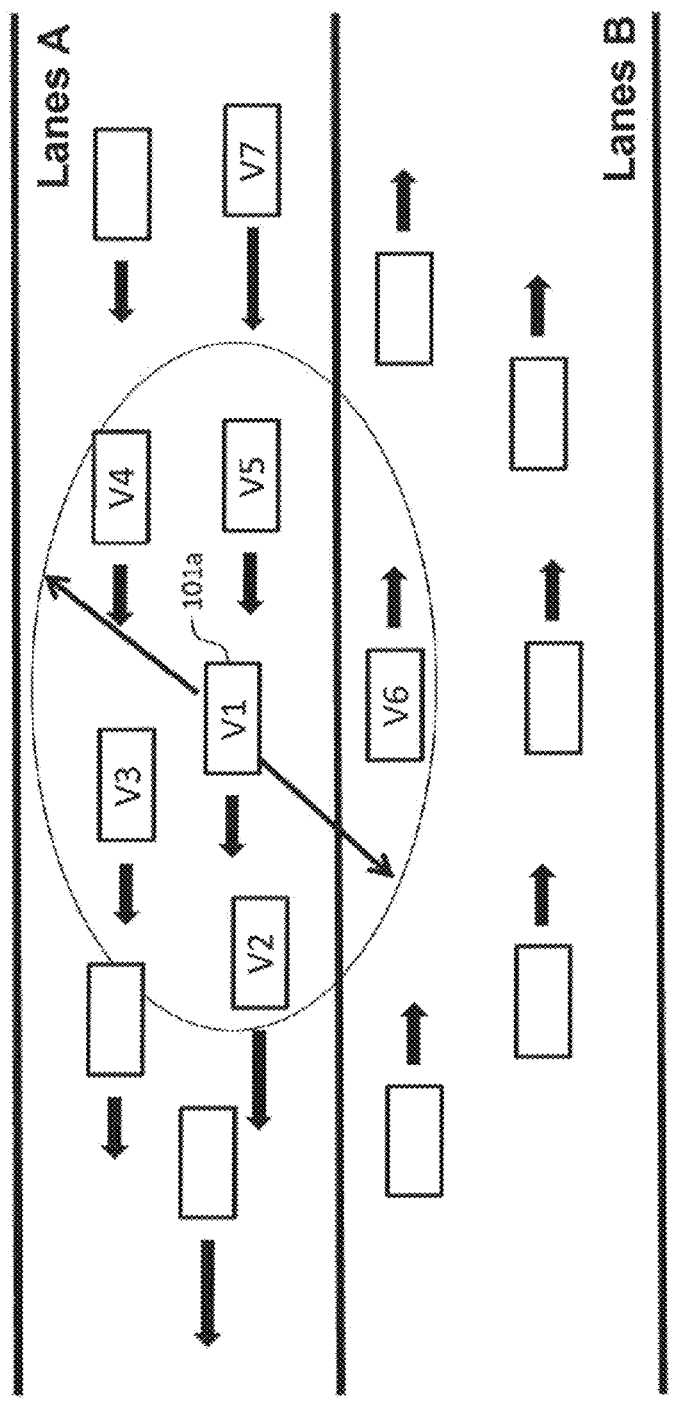

COMMUNICATION DEVICE AND METHOD FOR V2X COMMUNICATION

CROSS-REFERENCE TO RELATED APPLICATIONS

This application is a continuation of International Application No. PCT/EP2015/070843, filed on Sep. 11, 2015, the disclosure of which is hereby incorporated by reference in its entirety.

TECHNICAL FIELD

The present invention relates to wireless mobile communications. More specifically, the present invention relates to a communication device and method for V2X communication.

BACKGROUND

Cooperative Intelligent Transport Systems (C-ITS) refer to the set of applications and use cases based on the exchange of messages between traffic participants in order to improve road safety, traffic efficiency or travel comfort. In this context, messages can be exchanged between vehicles (Vehicle-to-Vehicle communication, V2V communication), between vehicles and consumer electronics devices such as smartphones or wearables (Vehicle-to-Pedestrian communication, V2P communication), and between vehicles and road infrastructure such as traffic lights or road signs (Vehicle-to-Infrastructure communication, V2I communication). This is overall referred to as vehicle-to-everything communication or V2X communication. In the case of cooperative aware (CA) traffic safety applications, each vehicle broadcasts regularly beacons with its position, velocity, trajectory and other useful data to the vehicles in its vicinity.

The European and American systems for C-ITS are known as ETSI ITS-G5 and Wireless Access in Vehicular Environments (WAVE). Both the American and the European systems for C-ITS operate at 5.9 GHz and are based on the IEEE 802.11p standard, which defines the physical (PHY) and Medium Access Control (MAC) layers based on previous standards for Wireless Local Access Networks (WLAN). In particular, the IEEE 802.11p standard incorporates, with some modifications, the physical layer based on Orthogonal Frequency Division Multiplexing (OFDM) from the IEEE 802.11a standard, and the MAC layer based on the Enhanced Distributed Channel Access (EDCA) from the IEEE 802.11e standard. The EDCA protocol is contention-based and uses Carrier Sense Multiple Access (CSMA) with Collision Avoidance (CSMA/CA) and four different access classes (ACs). In addition to the EDCA protocol, several solutions such as De-centralized Control Congestion (DCC) or Self-organizing Time Division Multiple Access (STDMA) have been proposed in the literature and the standardization groups to improve the performance of the channel access in the IEEE 802.11p standard.

The EDCA protocol included in the IEEE 802.11p standard for channel access is not well suited to ensure the QoS requirements of C-ITS in congested scenarios. According to the CSMA/CA mechanism on which the EDCA protocol is based, a 802.11p mobile station, which could be implement within a vehicle, first senses the channel during a listening period before the transmission of information. If the channel is not occupied, the mobile station transmits immediately. Otherwise, the mobile station performs a back off procedure. The back off time that a mobile station must wait before transmission is random but limited by a parameter known as the contention window (CW). A collision occurs when multiple mobile stations try to transmit at the same time. The EDCA protocol includes four priority levels known as ACs with different listening periods and CWs. ACs with higher priority generally allow faster channel access by using shorter listening periods and shorter CWs.

In congested scenarios, i.e. when a high number of 802.11p mobile stations are competing to access the channel, the transmission of information can be delayed beyond acceptable values for C ITS due to the high probability of collision in the EDCA protocol. The DCC mechanism has been proposed as a manner to reduce the channel congestion with the EDCA protocol. When DCC is used, the transmission parameters (including power, periodicity of broadcasting beacons and carrier sense range) are updated according to the channel load observed by each 802.11p mobile station. Typically the response is to reduce the transmit power or the broadcasting periodicity when a higher channel load is detected.

Another proposed mechanism to improve the channel access in 802.11p mobile stations is to replace or adapt the CSMA/CA mechanism of the EDCA protocol with distributed time division multiplexing access (TDMA) mechanisms such as Self-Organized TDMA (STDMA). In this case, all mobile stations are assumed to be synchronized in the time domain, which is divided into frames, which in turn are divided into slots. The duration of each slot typically corresponds to the transmission time of one broadcasting beacon. Each mobile station selects randomly among free slots, a number of slots within each frame to transmit. In case all the slots are occupied, the mobile stations select the slot that is occupied by the mobile station located furthest away to minimize the interference. In order for STDMA schemes to operate correctly, it is important that all mobile stations are synchronized in the time domain, which it is generally achieved by means of a Global Navigation Satellite System (GNSS) such as the Global Positioning Service (GPS).

802.11p mobile stations are designed to operate in a distributed manner without any kind of centralized management. This is usually referred to as Vehicular Ad-hoc Networks (VANETs). This means that each IEEE 802.11p mobile station has to configure its parameters for transmission and channel access independently. In this context, the CSMA/CA mechanism results in unbounded delays for the messages as a result of the random back-off procedure and the high probability of channel collisions when the number of mobile stations competing for channel access increases. Distributed TDMA schemes like STDMA, on the other hand, are capable to provide deterministic channel access probabilities for all transmitting mobile stations. Nevertheless, they still rely on distributed resource allocation, and therefore, are prone to interference situations between transmitting mobile stations, which in turn, can delay the successful reception of messages beyond tolerable delays. Once a time slot selection has been made in STDMA, it continues to be used for 3 to 8 seconds, so that the relative position between mobile stations might change up to a few hundred meters during this time. This is especially critical in situations where mobile stations are travelling with very high velocity relative to each other, such as in the case of vehicles travelling in different directions on a motorway. In this context, the resource allocation performed by STDMA cannot react on time to the fast variations of the VANET, and therefore, the exchange of messages between mobile stations is prone to errors as a result of severe interference.

SUMMARY

It is an object of the invention to improve V2X communication, in particular to provide an improved communication device and method for V2X communication allowing for efficient and reliable communication in scenarios with a dynamically changing set of communication devices that compete for communication resources.

This object is achieved by the subject-matter of the independent claims. Further implementation forms are apparent from the dependent claims, the description, and the figures.

The present invention is based on the general idea to pre-configure communication resources for distributed TDMA schemes based on context information, in order to reduce interference and collisions of communications between communication devices.

A communication device can be a mobile communication device such as a vehicle, e.g. a car, a motorcycle, a cycle, an airplane, and the like. Also a static device, such as a traffic surveillance system, can be a communication device. A communication device can also be a device that is attached to and/or integrated into one of the aforementioned devices.

Context information can be in particular position-based information, e.g. position, velocity, direction, and/or acceleration of a communication device.

Additionally or alternatively, context information can be based on a type of the communication device. A type can be based on a physical property of the communication device or of an object to which the communication device is assigned or into which it is integrated (e.g. a vehicle)", e.g. position, mass, and the like. A type can also be based on a functional property of the communication device or of an object to which the communication device is assigned or into which it is integrated (e.g. a vehicle)", such as police car or ambulance car. A type can also be based on the communication capabilities of the communication device. For example, some communication devices are only capable to use predefined resources of the radio frame, in particular not all resources.

Context information can also comprise metadata, i.e. information about context information. For example congestion information of how many communications devices are within a certain range of another communication device can be based on position-based information of all neighbouring communication devices.

Thus, according to a first aspect the invention relates to a (V2X) communication device configured to receive context information of one or more communication devices and/or of the environment of a communication device and configured to configure a radio frame, in particular a control channel of a radio frame, based on the received context information.

In a first possible implementation form of the first aspect of the invention as such the radio frame comprises a plurality of communication resources, wherein the communication device is configured to configure the radio frame by allocating at least two groups of communication resources of a plurality of communication resources of the radio frame to at least two groups of communication devices of the plurality of other communication devices based on the context information.

In a second possible implementation form of the first implementation form of the first aspect of the invention the communication device is configured to configure the radio frame by allocating the at last two groups of communication resources of the plurality of communication resources of the radio frame to at least two groups of communication devices of the plurality of other communication devices based on a velocity and/or a position of at least one of the plurality of other communication devices and/or the density of the plurality of other communication devices. This implementation form provides, for instance, the advantage that vehicles moving in the same direction/lane can be grouped in the same resource pool and, therefore, e.g. because of similar dynamical conditions of the communication devices within a certain group, interferences can be mitigated.

In a third possible implementation form of the first or second implementation form of the first aspect of the invention the communication device is further configured to broadcast the allocation of the plurality of communication resources of the radio frame into at least two groups based on the context information to the plurality of other communication devices such that a respective communication device of the plurality of other communication devices selects a communication resource of the plurality of communication resources of the radio frame from a group of the at least two groups of communication resources to which the respective communication device has been allocated.

In a fourth possible implementation form of any one of the first to third implementation form of the first aspect of the invention the communication device is further configured to dynamically adapt the allocation of the at least two groups of communication resources of the plurality of communication resources of the radio frame to the at least two groups of communication devices of the plurality of other communication devices based on the context information.

Dynamical adaptation in this case means that an adaptation takes place while at least one other condition is not adapted, for example the allocation is adapted during a communication is ongoing.

In a fifth possible implementation form of any one of the first to fourth implementation form of the first aspect of the invention the communication resources of a first group of communication resources of the at least two groups of communication resources of the plurality of communication resources of the radio frame are orthogonal to the communication resources of a second group of communication resources of the at least two groups of communication resources of the plurality of communication resources of the radio frame. Signals communicated over orthogonal communication resources do not interfere with each other, or their interference is low, in particular below a predefined or generally accepted threshold.

In a sixth possible implementation form of any one of the first to fifth implementation form of the first aspect of the invention the communication device is further configured to assign different priorities to the at least two groups of communication resources of the plurality of communication resources such that a respective communication device of the plurality of other communication devices selects a communication resource of the plurality of communication resources of the radio frame from a group of the at least two groups of communication resources according to the different priorities. For example, two subgroups can be defined within a certain group and a device can be assigned preferably to one of the subgroups. Only if this is subgroup full, in particular congested up to a certain limit, the communication device can be assigned to the other, in particular orthogonal subgroup. Thereby, advantageously communication interferences can be mitigated and resources can be used efficiently.

In a seventh possible implementation form of any one of the first to sixth implementation form of the first aspect of the invention the communication device is configured to configure the radio frame by allocating at least two groups of communication resources of the plurality of communication resources of the radio frame to at least two groups of communication devices of the plurality of other communication devices based on the context information periodically or event-driven. One advantage of this implementation form is that changes of the radio frame can be scheduled.

In an eighth possible implementation form of any one of the first to sixth implementation form of the first aspect of the invention the communication device is configured to configure the radio frame by allocating at least two groups of communication resources of the plurality of communication resources of the radio frame to at least two groups of communication devices of the plurality of other communication devices based on the context information such that the number of communication resources within a group of the at least two groups of communication resources is correlated, in particular is proportional, to the number of communication devices within a group of the at least two groups of communication devices of the plurality of other communication devices. Thereby, advantageously, interferences due to high congestion can be mitigated.

In a ninth possible implementation form of any one of the first to eighth implementation form of the first aspect of the invention as such the radio frame comprises a plurality of communication resources, wherein the communication device is configured to configure the radio frame by predicting based on the context information at least one other communication device of a plurality of other communication devices to have access to the same communication resources of the plurality of communication resources as the communication device within a prediction interval and by selecting a communication resource of the plurality of communication resources of the radio frame on the basis of the prediction for the prediction interval. A prediction method can be any method that can be based on context information. The object of the prediction is to identify which communication device can be a one-hop neighbour of the communication device. In particular, if according to the prediction, the other communication device is going to remain out of range, there might be no need to change the resource allocation.

In a tenth possible implementation form of the ninth implementation form of the first aspect of the invention the communication device is configured to reselect a communication resource of the plurality of communication resources, in case the at least one other communication device, predicted by the communication device to have access to the same communication resources of the plurality of communication resources as the communication device within the prediction interval, has selected and/or will select the same communication resource of the plurality of communication resources as the communication device within the prediction interval. This implementation form provides, for instance, the advantage that a conflicting use of a communication resource can be avoided.

In an eleventh possible implementation form of the ninth or tenth implementation form of the first aspect of the invention the communication device is configured to predict based on the context information at least one other communication device of the plurality of other communication devices to have access to the same communication resources of the plurality of communication resources as the communication device by receiving from each other one-hop neighboring communication device the context information of the other one-hop neighboring communication device and the context information of the other communication devices of the plurality of other communication devices that are other one-hop neighboring communication devices of the other one-hop neighboring communication device.

A one-hop neighbour can be another communication device within a certain area, radius, and/or distance from the communication device, e.g. all communication devices within a circle of a radius of thousand meter around the communication device. A one-hop neighbour can also be a communication device whose signal fulfils a certain requirement when received by the communication device, e.g. the signal strength exceeds a certain threshold. A one-hop neighbour generally does or will compete with the communication device among one or more communication resources. The communication device can have one or more one-hop neighbours.

In a twelfth possible implementation form of the first aspect of the invention as such or any one of the first to eleventh implementation form thereof the context information comprises information about the position of a communication device of the plurality of other communication devices, information about the velocity of a communication device of the plurality of other communication devices, information about the technical capabilities of a communication device of the plurality of other communication devices, road traffic information, an identifier of a communication device of the plurality of other communication devices and/or a timestamp.

The communication device can be a base station or a user equipment. The user equipment can be arranged within a vehicle or car or can be carried by a pedestrian. Furthermore, the communication device can be arranged within a traffic infrastructure device.

The communication device can be configured to operate within a vehicle-to-X (V2X) communication network. The vehicle-to-X (V2X) communication network can be an IEEE 802.11p based communication network or a long term evolution (LTE) based communication network. V2X communication can be used to extend the perception horizon of vehicles beyond the LoS of deployed sensors and up to several kilometers. Combining the information gathered by multiple vehicles and fixed infrastructure (e.g., traffic surveillance cameras at intersections), leads to an extended perception horizon reaching far beyond the limited field of view of a single vehicle or its driver. This enables drivers and systems for autonomous driving to recognize hazards in advance and take preventive actions much earlier, but requires cooperation (i.e., information exchange) between the traffic participants. Congested scenarios, i.e. scenarios with a high number of traffic participants, may experience a higher delay and error rate as a result of interference and packet collisions between transmitting stations, which might have negative consequences to the safety of the traffic participants (e.g. drivers and passengers). The proposed invention aims at reducing the interference and collision probability between stations, and therefore, contributes to improving the reliability of V2X communication and traffic safety in general.

In a thirteenth implementation form of the communication device (101a, 107) of any one of the implementation forms of the first aspect, the communication device is configured to predict a communication resource or an allocation configuration, in particular during a non-coverage phase, based on a stored configuration, in particular during a coverage phase.

In a sixteenth implementation form of the communication device (101a, 107) of any one of the preceding claims, the communication device is configured to reconfigure a communication resource, in particular during a coverage phase, when a resource configuration has expired. During a coverage phase the device can be connected to a base station, while during a non-coverage phase the device can only connect to other devices within an ad-hoc mode.

According to a second aspect the invention relates to a method of operating a communication device. The method comprises the steps of receiving context information of a plurality of other communication devices and the environment of the plurality of other communication devices and configuring a radio frame, in particular a control channel of a radio frame, based on the context information.

The method according to the second aspect of the invention can be performed, for instance, by the communication device according to the first aspect of the invention. Further features of the method according to the second aspect of the invention result directly from the functionality of the communication device according to the first aspect of the invention and its different implementation forms.

According to a third aspect the invention relates to a computer program comprising a program code for performing the method according to the second aspect of the invention when executed on a computer.

The invention can be implemented in hardware and/or software.

BRIEF DESCRIPTION OF THE DRAWINGS

Further embodiments of the invention will be described with respect to the following figures, wherein:

FIGS. 7a-c show schematic diagrams illustrating the allocation of communication resources by a communication device according to an embodiment.

DETAILED DESCRIPTION OF EMBODIMENTS

Figure 1:
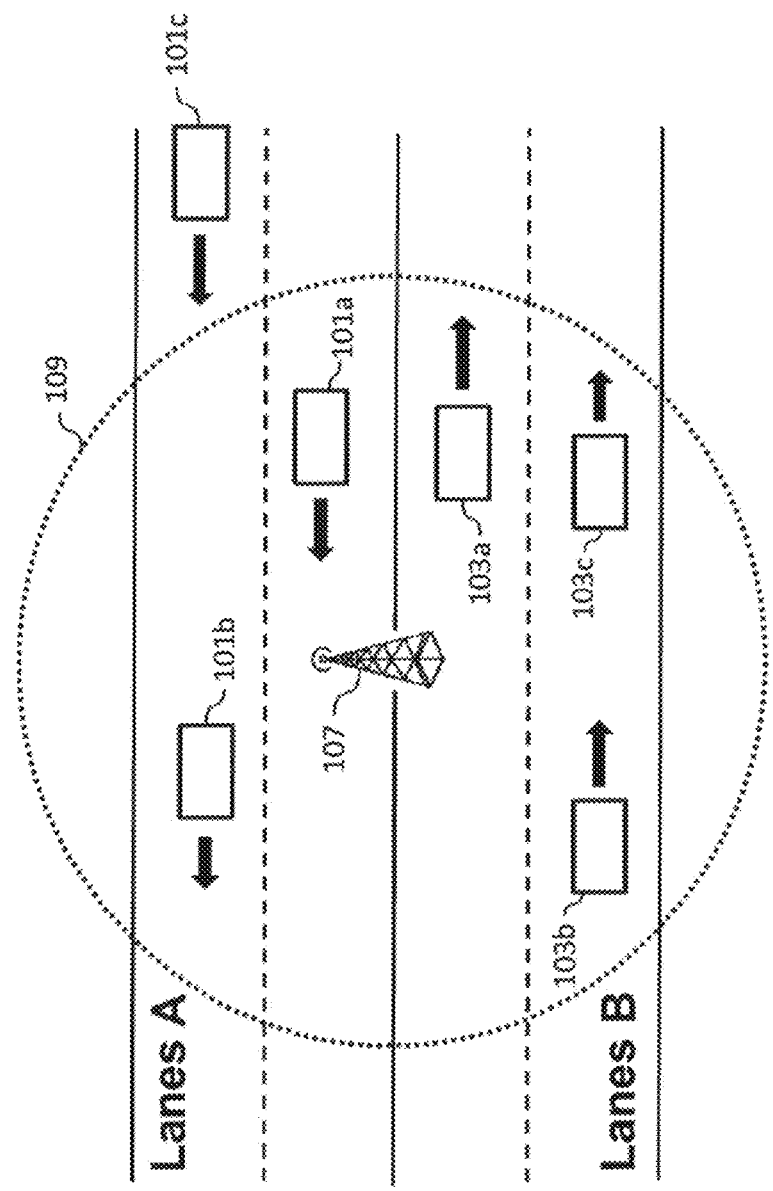
FIG. 1 shows a schematic diagram of a communication scenario including a communication device according to an embodiment.

FIG. 1 shows a schematic diagram of a communication scenario including a plurality of communication devices 101a-c and 103a-c. In an embodiment, the plurality of communication devices 101a-c and 103a-c are implemented in the form of a mobile station or user equipment. The mobile station or user equipment can be arranged within a vehicle or car or can be carried by a pedestrian. Furthermore, the communication device can be arranged within a traffic infrastructure device. The plurality of communication devices 101a-c and 103a-c can be configured to operate within a vehicle-to-X (V2X) communication network. The vehicle-to-X (V2X) communication network can be an IEEE 802.11p based communication network or a long term evolution (LTE) based communication network. In an embodiment, at least some of the communication devices of the plurality of communication devices 101a-c and 103a-c are configured to communication with and via a further communication device in form of a base station 107.

The base station 107 is configured to receive context information of the plurality of communication devices and the environment of the plurality of communication devices 101a-c and 103a-c and to configure a radio frame, in particular a control channel of a radio frame, based on the context information.

In an embodiment, the context information comprises information about the position of a communication device of the plurality of communication devices 101a-c and 103a-c, information about the velocity of a communication device of the plurality of communication devices 101a-c and 103a-c, information about the technical capabilities of a communication device of the plurality of communication devices 101a-c and 103a-c, road traffic information, an identifier of a communication device of the plurality of communication devices 101a-c and 103a-c and/or a timestamp.

Figure 2:
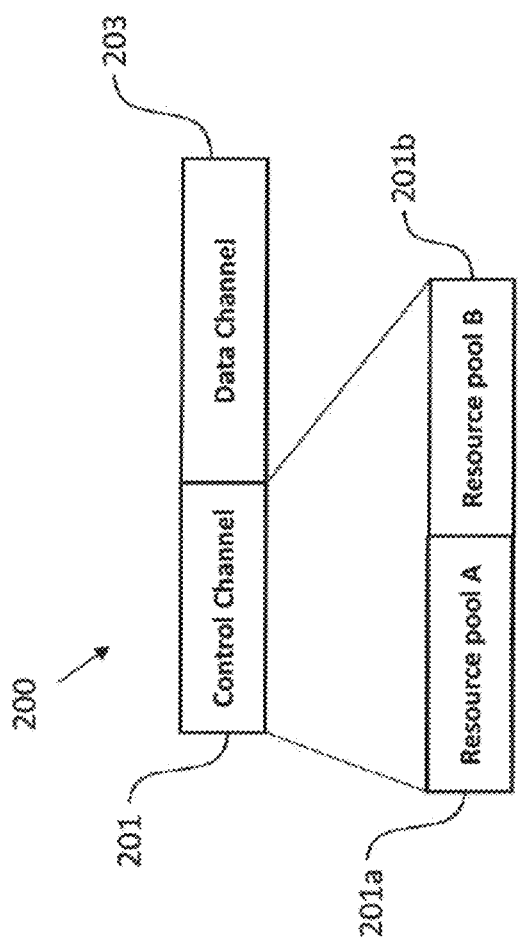
FIG. 2 shows a schematic diagram of a radio or communication frame that can be used in a communication device or method according to an embodiment.

FIG. 2 shows a schematic diagram of an exemplary radio or communication frame 200 configured by the base station 107. In an embodiment, the radio frame 200 comprises a plurality of communication resources, wherein the base station 107 is configured to configure the radio frame 300 by allocating at least two groups 201a, 201b of communication resources of a plurality of communication resources of the radio frame 200 to at least two groups of communication devices of the plurality of communication devices 101a-c and 103 a-c based on the context information.

In the embodiment shown in FIG. 2 the radio frame 200 has a control channel 201 and a data channel 203. In an embodiment, the control channel 201 of the radio frame 200 comprises a first pool of communication resources 201a and a second pool of communication resources 201b.

In an embodiment, the base station 107 is configured to configure the radio frame 200 by allocating the at last two groups 201a, 201b of communication resources of the plurality of communication resources of the radio frame 200 to at least two groups of communication devices of the plurality of communication devices 101a-c and 103a-c based on the velocities and/or the positions of the plurality of communication devices 101a-c and 103a-c and/or the density of the plurality of other communication devices 101a-c and 103a-c.

For instance, in the exemplary scenario shown in FIG. 1 the base station 107 could be configured to configure the radio frame 200 by allocating the at last two groups 201a, 201b of communication resources of the plurality of communication resources of the radio frame 200 to a first group of communication devices 101a-c moving in a first direction and to a second group of communication devices 103a-c moving in a second direction opposite to the first direction.

In an embodiment, the base station 107 is further configured to broadcast the allocation of the plurality of communication resources of the radio frame 200 into at least two groups based on the context information to the plurality of communication devices 101a-c and 103a-c such that a respective communication device of the plurality of communication devices 101a-c and 103a-c selects a communication resource of the plurality of communication resources of the radio frame 200 from a group of the at least two groups 201a, 201b of communication resources to which the respective communication device has been allocated.

In an embodiment, the base station 107 is further configured to dynamically adapt the allocation of the at least two groups 201a, 201b of communication resources of the plurality of communication resources of the radio frame 200 to the at least two groups of communication devices of the plurality of communication devices 101a-c and 103a-c based on the context information.

In an embodiment, the communication resources of a first group of communication resources of the at least two groups 201a, 201b of communication resources of the plurality of communication resources of the radio frame 200 are orthogonal (in frequency) to the communication resources of a second group of communication resources of the at least two groups 201, 201b of communication resources of the plurality of communication resources of the radio frame 200.

In an embodiment, the base station 107 is further configured to assign different priorities to the at least two groups 201a, 201b of communication resources of the plurality of communication resources such that a respective communication device of the plurality of communication devices 101a-c and 103a-c selects a communication resource of the plurality of communication resources of the radio frame 200 from a group of the at least two groups 201a, 201b of communication resources according to the different priorities.

In an embodiment, the base station 107 is configured to configure the radio frame 200 by allocating at least two groups 201a, 201b of communication resources of the plurality of communication resources of the radio frame 200 to at least two groups of communication devices of the plurality of communication devices 101a-c and 103a-c based on the context information periodically or event-driven.

In an embodiment, the base station 107 is configured to configure the radio frame 200 by allocating at least two groups 201a, 201b of communication resources of the plurality of communication resources of the radio frame 200 to at least two groups of communication devices of the plurality of communication devices 101a-c and 103a-c based on the context information such that the number of communication resources within a group of the at least two groups 201a, 201b of communication resources is proportional to the number of communication devices within a group of the at least two groups of communication devices of the plurality of communication devices 101a-c and 103a-c.

According to the invention also at least one of the plurality of communication devices 101a-c and 103a-c, for instance the communication device 101a shown in FIG. 1, is configured to receive context information from the other communication devices of the plurality of communication devices 101b-c and 103a-c and the environment of the plurality of other communication devices 101b-c and 103a-c and to configure the radio frame 200, in particular the control channel 201 of the radio frame 200, based on the context information.

In an embodiment, the context information comprises information about the position of a communication device of the plurality of other communication devices 101b-c and 103a-c, information about the velocity of a communication device of the plurality of other communication devices 101b-c and 103a-c, information about the technical capabilities of a communication device of the plurality of other communication devices 101b-c and 103a-c, road traffic information, an identifier of a communication device of the plurality of other communication devices 101b-c and 103a-c and/or a timestamp.

In an embodiment the communication device 101a is configured to configure the radio frame 200 by predicting based on the context information at least one other communication device of the plurality of other communication devices 101b-c and 103a-c to have access to the same communication resources of the plurality of communication resources as the communication device 101a within a prediction interval and by selecting a communication resource of the plurality of communication resources of the radio frame 200 on the basis of the prediction for the prediction interval.

In an embodiment the communication device 101a is configured to reselect a communication resource of the plurality of communication resources, in case the at least one other communication device, predicted by the communication device 101a to have access to the same communication resources of the plurality of communication resources as the communication device 101a within the prediction interval, has selected the same communication resource of the plurality of communication resources as the communication device 101a within the prediction interval.

In an embodiment the communication device 101a is configured to predict based on the context information at least one other communication device of the plurality of other communication devices 101b-c and 103a-c to have access to the same communication resources of the plurality of communication resources as the communication device 101a by receiving from each other one-hop neighboring communication device the context information of the other one-hop neighboring communication device and the context information of the other communication devices of the plurality of other communication devices that are other one-hop neighboring communication devices of the other one-hop neighboring communication device.

In the following, further implementation forms, embodiments and more detailed aspects of the embodiments disclosed above will be described.

As described already above, the present invention allows dividing a common pool of communication resources in the time and/or frequency domain of a radio frame into sub-pools, so that each sub-pool is allocated to, e.g., different travelling directions and/or to different speed categories of the communication devices 101a-c and 103a-c. In an embodiment, the pre-allocation of sub-pools across different travelling directions and/or speed categories of the communication devices 101a-c and 103a-c can vary across different geographical regions, and for each region, it could be configured based on known traffic patterns. The communication devices of the same group or category, for instance the communication devices 101a-c moving in the same direction in FIG. 1, compete with each other according to a particular distributed TDMA scheme within a sub-pool of resources in order to obtain transmission opportunities. In an embodiment, the sub-pool can be defined both as a sub-set of the overall pool so that the communication devices of one group or category first try to look for free resources in the sub-pool assigned to this group. In an embodiment, if no resources in this sub-pool are available, the communication device looks for free resources in the other groups.

The integration of GPS receivers in communication devices and advanced navigation systems in vehicles enables a very accurate computation of the travelling direction and speed. The pre-configuration of sub-pools to different travelling directions and/or velocities should be disseminated among the communicating devices, so that every communication device of the same group operates with the same sub-pools of communication resources. According to the present invention this can be achieved in different ways. For example, in the case where network coverage, such as from a cellular communication system (as provided by the base station 107 shown in FIG. 1), is present at least at some points inside the service area, it is possible to dynamically adapt the allocation of sub-pools of communication resources to different travelling directions and/or speeds in a centralized manner, according to the current traffic conditions within a certain geographical area. For instance, if more communication devices are travelling in one direction, the allocation of sub-pools of communication resources is updated by the base station 107 or by a backend end system connected to the base station 107 in order to provide more communication resources to the direction of heavier traffic. The new configuration is transmitted to the communication devices in order to adapt the operation of the distributed TDMA channel access accordingly.

Figure 3:
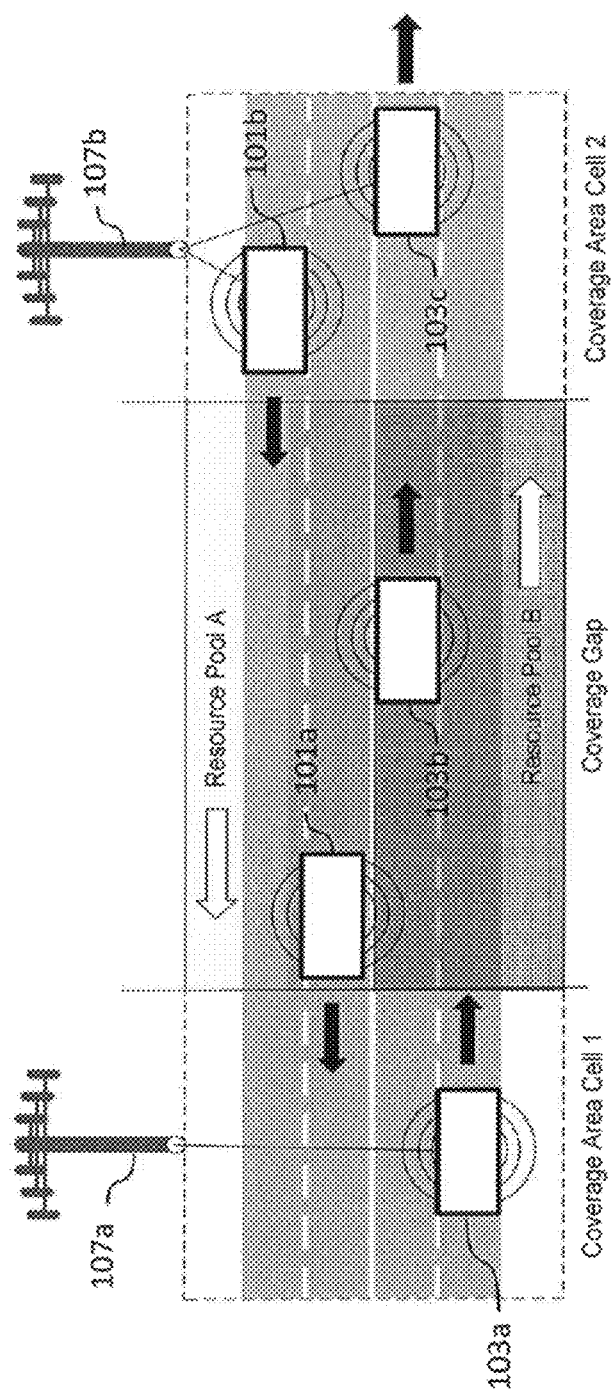
FIG. 3 shows a schematic diagram illustrating the allocation of communication resources by a communication device according to an embodiment.

Furthermore, it is possible to anticipate cellular-coverage gaps along the service area in order to provide an adequate allocation of sub-pools to the communication devices which are about to exit the network coverage area, such as the network coverage area 109 indicated by the ring around the base station 107 in FIG. 1. In an embodiment, these communication devices can download from the base station 107 the configuration in advance and operate according to it while travelling along a cellular-coverage gap, as schematically illustrated in FIG. 3 in the context of the exemplary communication devices 101a-b and 103a-c and two base stations 107a and 107b.

As already described above in the context of FIG. 1 and FIG. 2, the communication devices 101a-c in lanes A could use the first pool of communications resources 201a of the control channel 201 of the radio frame 200 and the communication device in lanes B (i.e. going in the opposite direction) could use the second pool of communication resources 201b of the control channel 201 of the radio frame 200. Thus, two orthogonal resource sub-pools are employed for the communication devices 101a-d and 103a-c in the two different directional lanes. Thus, the high mutual interference coming from communication devices of another lane with high relative speed can be eliminated. A respective communication device only needs to coordinate the communication resource usage with its neighbors of its own lane (with low relative speed) within its resource sub-pool, whereas the communication devices of the other lane with high relative speed use another orthogonal resource sub-pool and will not create mutual interference. In an embodiment, in the case that no communication resources are available in one of the resource sub-pools, a respective communication device can be configured to looks for available communication resources in the other resource sub-pool, i.e. group.

Figure 4:
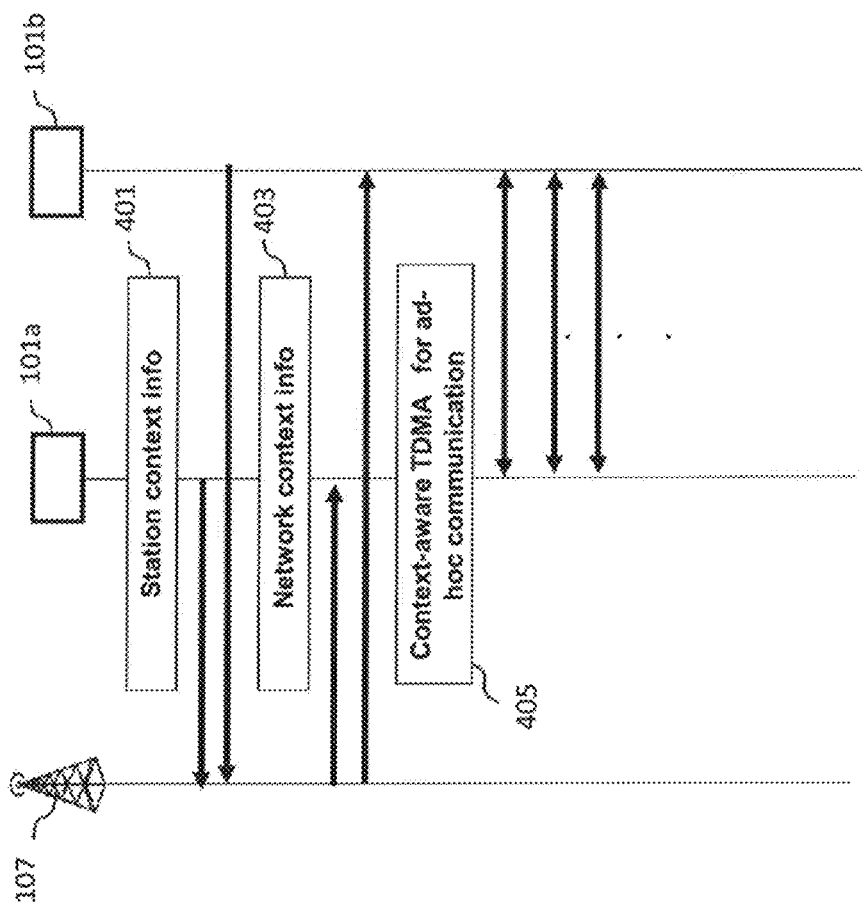
FIG. 4 shows a schematic diagram illustrating the allocation of communication resources by a communication device according to an embodiment.

FIG. 4 shows a signaling diagram illustrating an exemplary allocation of communication resources between the base station 107 and the communication devices 101a and 101b shown in FIG. 1. a communication device according to an embodiment.

In a first phase 401 the communication devices 101a and 101b (periodically or event-driven) send their context information to the base station 107, such as communication device ID, velocity info, position info, communication device capability info (e.g., supported frequency band) and timestamp. In an embodiment, the event-driven context updates from a communication device are triggered when the communication device changes its travelling context e.g., changes the street/location, changes the driving direction or significantly changes the speed.

In a second phase 403 the base station 107 is configured to perform (either periodically or event-driven) one or more of the following steps on the basis of the context information received from the communication devices 101a and 101b and, if available, any relevant road traffic information e.g., specific street/location and traffic density: (a) the configuration of the control channel 201 of the radio frame 200, i.e. how to divide the control channel (CC) 201 into different groups or sub-pools, the size of individual groups or sub-pools e.g., based on mobile station density; (b) determining how to group the communication devices based on their context information e.g., based on positioning info (lane ID), velocity info, or other context information; (c) determining how each communication device performs the distributed TDMA based on context information; and (d) broadcasting this network context information (at least "the configuration of the control channel") to the communication devices within its coverage area 109, such as the communication devices 101a and 101b.

In a third phase 405 the communication devices 101a and 101b, having received the network context information, in particular the configuration of the control channel 201 of the radio frame 200, from the base station 107, perform context-aware distributed TDMA on the basis of the network context information broadcast by the base station 107 in the second phase 403.

Figure 5:
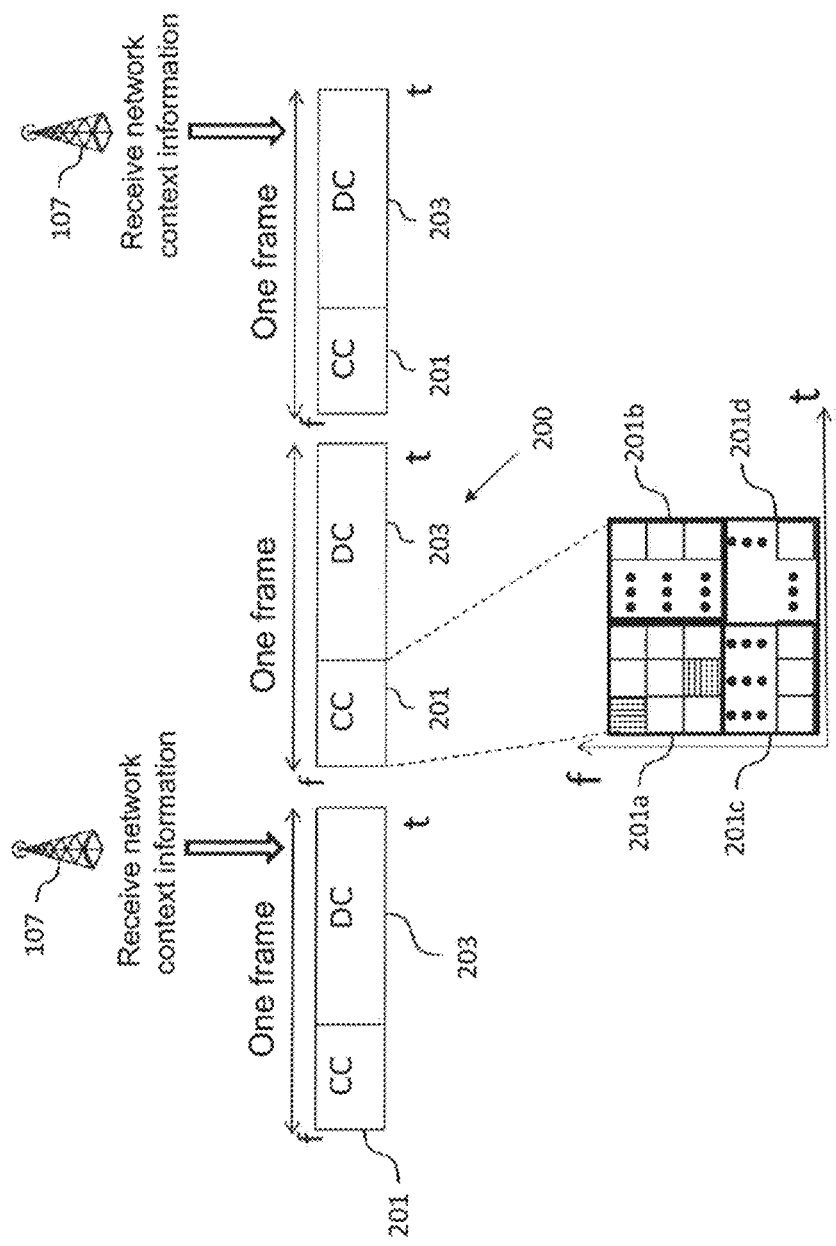
FIG. 5 shows a schematic diagram illustrating the allocation of communication resources by a communication device according to an embodiment.

A further example for a possible configuration of a plurality of communication resources or resource blocks of a control channel of a radio frame in the time and frequency domain by the base station is shown in FIG. 5. In FIG. 5 the control channel 201 of the radio frame 200 is divided in to four different groups or sub-pools corresponding respectively to driving west at more than 100 km/h (group 201a), driving west at less than 100 km/h (group 201b), driving east at more than 100 km/h (group 201c) and driving east at less than 100 km/h (group 201d). The base station 107 obtains the driving directions of the communication devices within its coverage area 109 from the known road traffic information. The communication devices are also grouped into the same four groups based on the driving directions and the speed. In an embodiment, the number of communication resources or resource blocks in each one of the groups or sub-pools can be proportional to the density of communication devices within the coverage area 109 of the base station 107 within each group or category, herein referred to as D1, D2, D3 and D4. The base station 107 can determine D1, D2, D3 and D4 on the basis of the context information provided during the first phase 403 in FIG. 4. In this manner, the number of communication resources allocated to each group or category in the control channel 201 can be easily computed as:

$$|RB_i|=D_i \times |RB|$$

where |RB| is the total number of resource blocks, $|RB_i|$ is the number of resource blocks assigned by the base station 107 to the group or category i and $D_i$ is the density of vehicles within group or category i. In this manner, a communication device assigned to the group or category D1 will try first to select a free resource block within group 201a, and in case all resources are occupied, it will move to group 201b, 201c and 201d in this order.

Figure 6A:
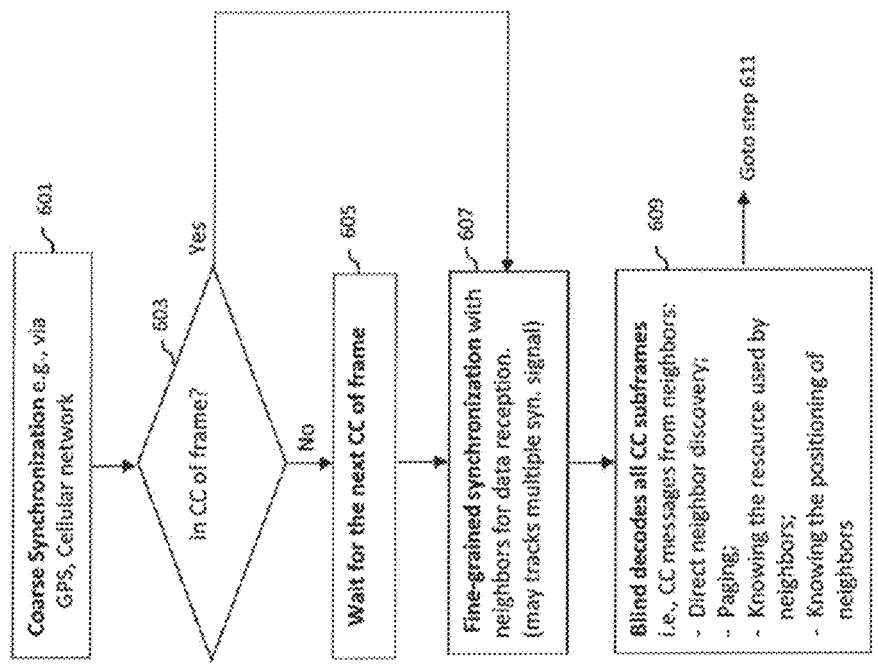
FIGS. 6a-c show flow diagrams illustrating the allocation of communication resources by a communication device according to an embodiment.
Figure 6B:
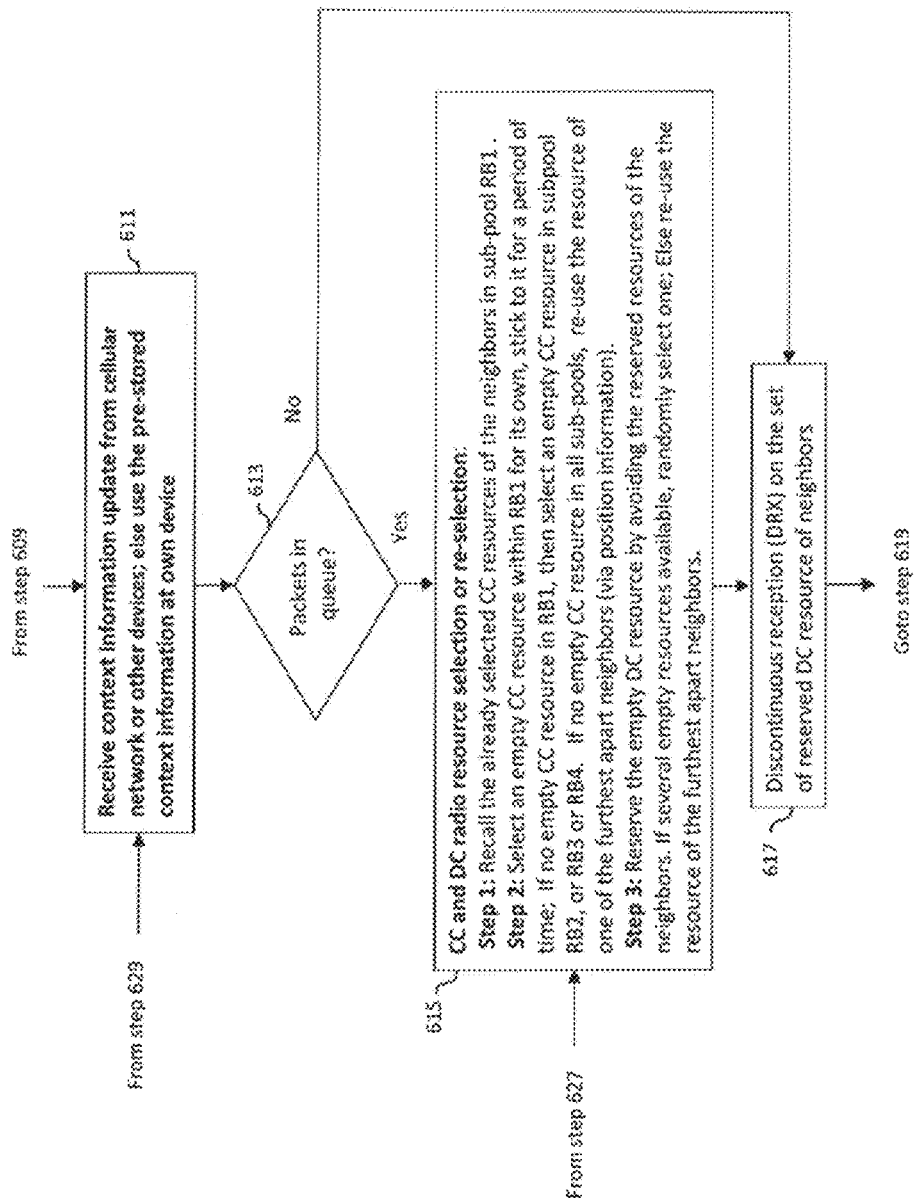
Figure 6C:
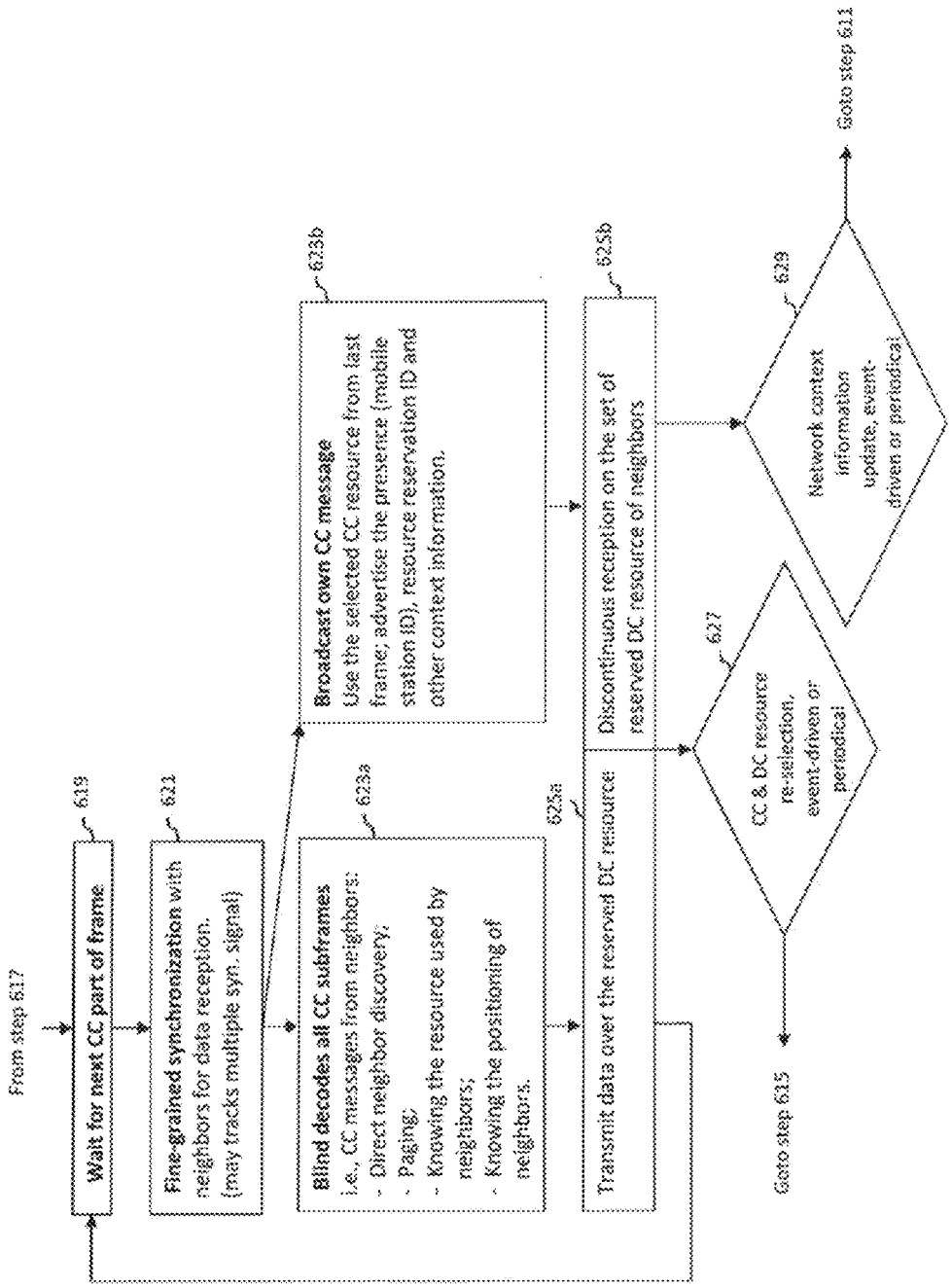

FIGS. 6a-c show flow diagrams illustrating the detailed steps taken by a communication device, for instance, the communication device 101a shown in FIG. 4, in response to receiving the network context information from the base station during the second phase 403 shown in FIG. 4. By way of example the network context information provided by the base station 107 contains the information that the communication device 101a has been assigned to group 201a (referred to in FIGS. 6a-c as RB1).

As can be taken from FIGS. 6a-c, the communication device 101a, upon being powered on and synchronized with its neighbors, will receive the network context information from the base station (for instance, steps 601 to 613). By utilizing this network context information, the communication device 101a will perform a context-aware distributed TDMA as indicated, for instance in steps 615 to 629. The communication device 101a can receive the update of network context information periodically or event-driven. In case of a periodical broadcasting of network context information, the base station 107 can adapt the update interval on the basis of the real-time road traffic conditions. For instance, the interval can be of the order of seconds or minutes. In case of an event-driven distribution of network context information, i.e. when a communication device changes its context information e.g., changes its driving direction, driving lane or driving speed, the communication device will notify the mobile base station as described in the context of the first phase 401 shown in FIG. 4. In response thereto, the base station 107 can send an update of the network context information to the communication device.

As already described in the context of FIG. 3, in the case of network coverage gaps, where communication devices might not be able to exchange context information with the base station 107, the base station 107 can be configured to anticipate such network coverage gaps along the service area in order to provide a pre-allocation of groups or sub-pools of communication resources to the communication devices which are about to exit the network coverage. In an embodiment, the communication devices can download the pre-allocation of communication resources in advance and utilize the pre-allocated communication resource pool during travelling within the cellular-coverage gap.

In an embodiment, the base station 107 is configured to anticipate whether a respective communication device is about to exit the network coverage and enter a coverage gap. This can be done, for instance, on the basis of an uplink signal strength, the location info of a communication device or on pre-computed cellular-coverage maps. In an embodiment, the base station 107 is moreover configured to broadcast a pre-allocation of communication resources to groups or sub-pools to those communication devices that are about to enter cellular-coverage gaps. These pre-allocated communication resources are used by the communication devices in the cellular-coverage gaps.

When communication devices have been out of cellular-coverage for a long time, the network context information may expire. In this case, a context-aware TDMA can be enabled by a sort of distributed context info exchange between communication devices according to an embodiment. As will be explained in more detail further below, this context information is based on collecting "local" context information by each communication device, such as driving direction and speed information.

In an embodiment, when a communication device is out of cellular-coverage, it derives the network context information on the basis of local observations/information, such as local driving directions and/or speeds. In an embodiment, each communication device is configured to broadcast its derived network context information to the other communication devices in its proximity, periodically or event-driven. In an embodiment, each communication device is configured to receive the network context information from all the other communication devices within its proximity and to merge this information into a single network context information and select the information that is from the majority of other communication devices. When a mobile device moves out of cellular network coverage, it can start receiving network context information from its encountered other mobile devices, in particular the configuration of the resource pool. One example is that the mobile device monitors the received network context information for a predefined period of time. Then, among its received samples from other mobile devices, it selects the network context information and/or the configuration of the resource pool from the majority of other mobile devices. Another example could be that it selects the network context information from the other mobile device with the longest time of being out-of-coverage. Then, advantageously it obtains the most reliable observations related to the out-of-coverage devices.

In an embodiment, in the case of no network coverage an additional distributed exchanging of one-hop neighbor context information can further improve the reliability of a distributed TDMA. In an embodiment, each communication device stores its one-hop neighbor context information, i.e. the context information from all communication devices within a one-hop distance of each communication device. In an embodiment, each communication device is configured to broadcast its one-hop neighbor context information to all the communication devices within its proximity or neighborhood, such that effectively each communication device receives the context information of its two-hop neighbors. In an embodiment, each communication device is configured to predict on the basis of the two-hop neighbor context information (i.e., communication device ID, location, velocity) to predict the new set of communication devices which will be within its proximity area, i.e. which will be its one-hop neighbors, during the next radio frame. In an embodiment, each communication device is configured to pro-actively re-select its communication resources to avoid interference, in case it predicts a new one-hop neighbor during the next radio frame using a conflicting communication resource.

Figure 7B:
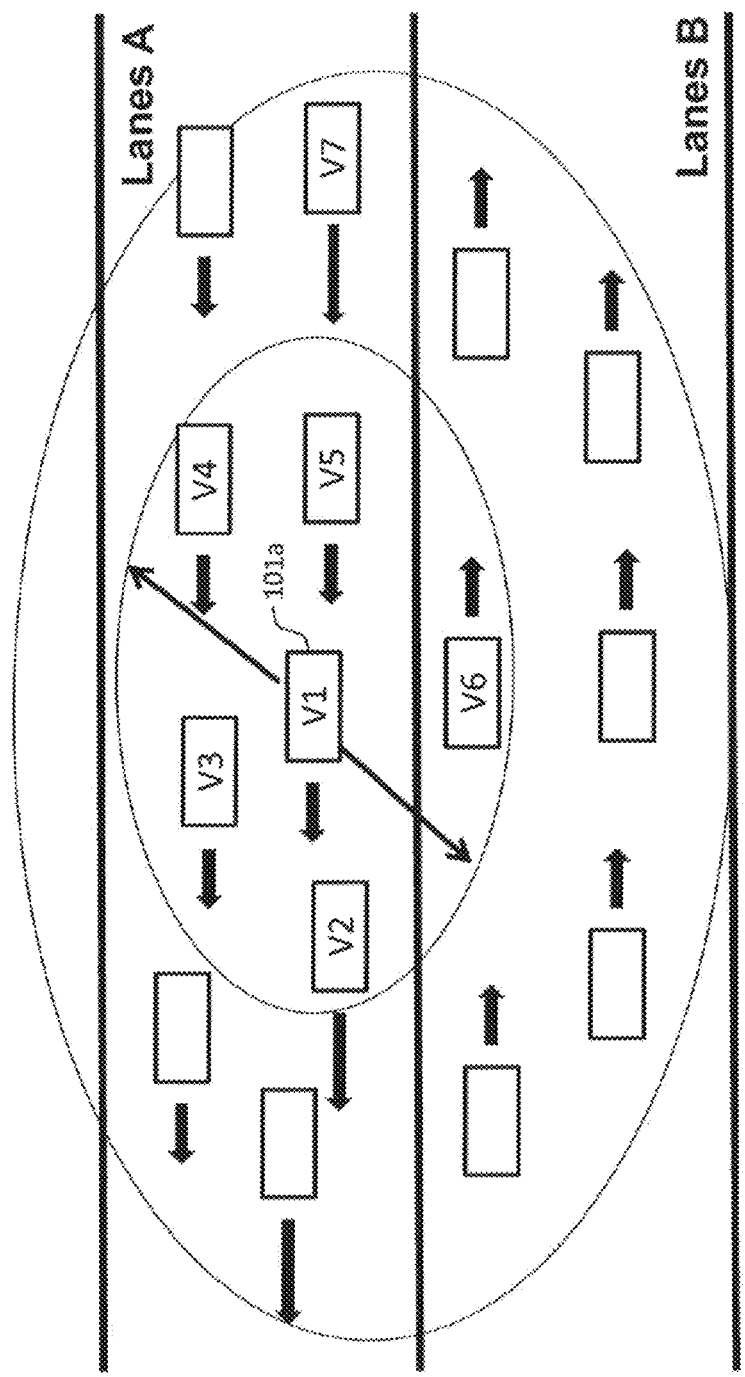
Figure 7C:
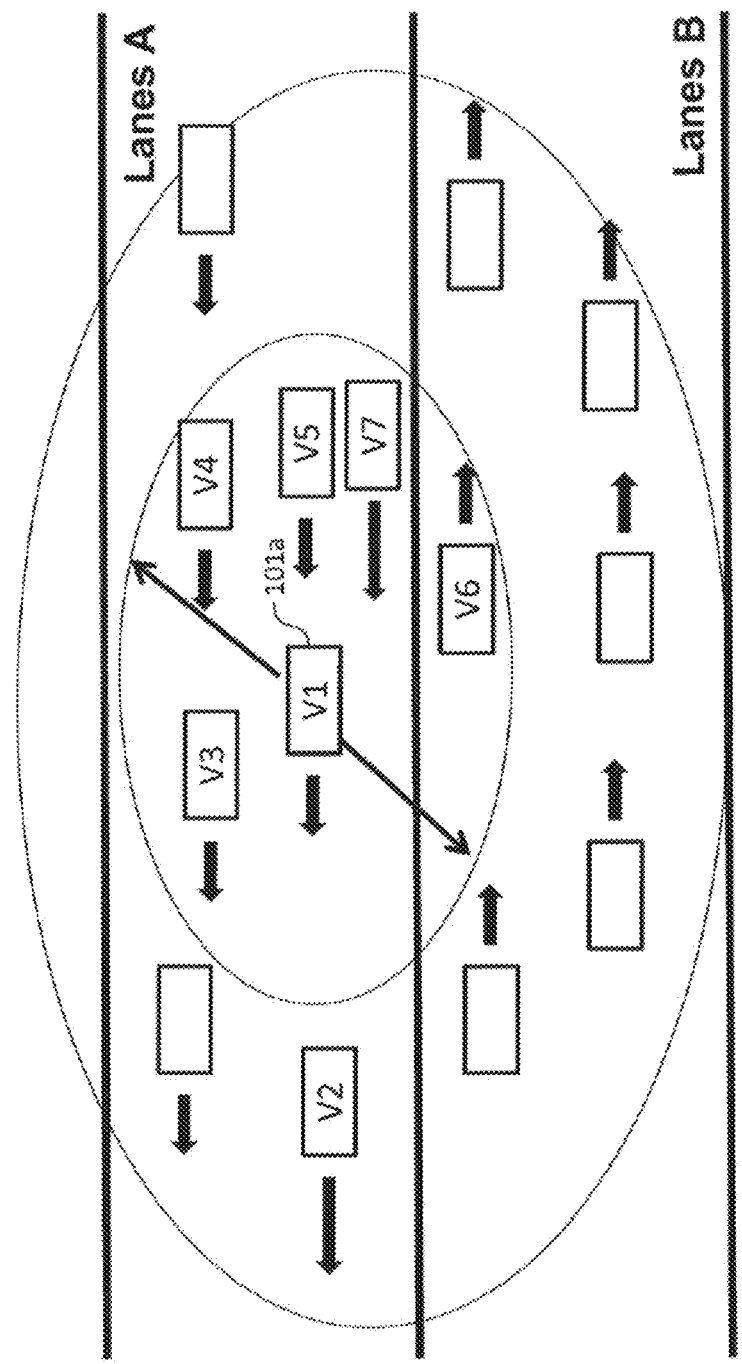

The above embodiments are illustrated by an example shown in FIGS. 7a-c. As shown in FIGS. 7a-c, there are two sets of driving lanes with opposite driving direction, namely lanes A and lanes B. The communication device 101a (also referred to as vehicle V1 in FIGS. 7a-v) is moving in one of the lanes of lanes A with a set of one hop neighbors including the communication devices or vehicles V2 to V6. By exchanging the context information with these one hop neighbors, the communication device 101a obtains a list of entries about its neighbors which includes information about the identification, position, velocity and the occupied communication resources of each communication device.

However, as this exchange of one hop neighbor context information is done by each communication device, the communication device 101a effectively obtains a list of its two hop neighbors and their respective context information, as illustrated in FIG. 7b. Also in this case, each of the entries can include ID, position, velocity and the occupied radio resource.

As illustrated in FIG. 7c, by having the two-hop neighbor context information (position, velocity), the communication device 101a can predict the new one-hop neighbor list in the next radio frame. For instance, the communication device 101a can predict that the communication device V7 will be a new one hop neighbor of the communication device 101a in the next radio frame, whereas V2 will no longer be a one hop neighbor of communication device 101*a*. In an embodiment, the estimated position of a two hop neighbor can be estimated as follows:

New_position=Old_position+velocity*length of radio frame;

If the new position of a neighboring communication device is within a certain distance of the communication device 101*a*, then it is considered as a new one hop neighbor of the communication device 101*a*, otherwise not. Additionally and alternatively, a one-hop neighbor can also be defined based on its signal quality, in particular signal strength, in view of the device. In particular, to become a one-hop neighbor the other device must be able to directly communicate with the device without relying on further devices that relay the communication signal.

Figure 8:
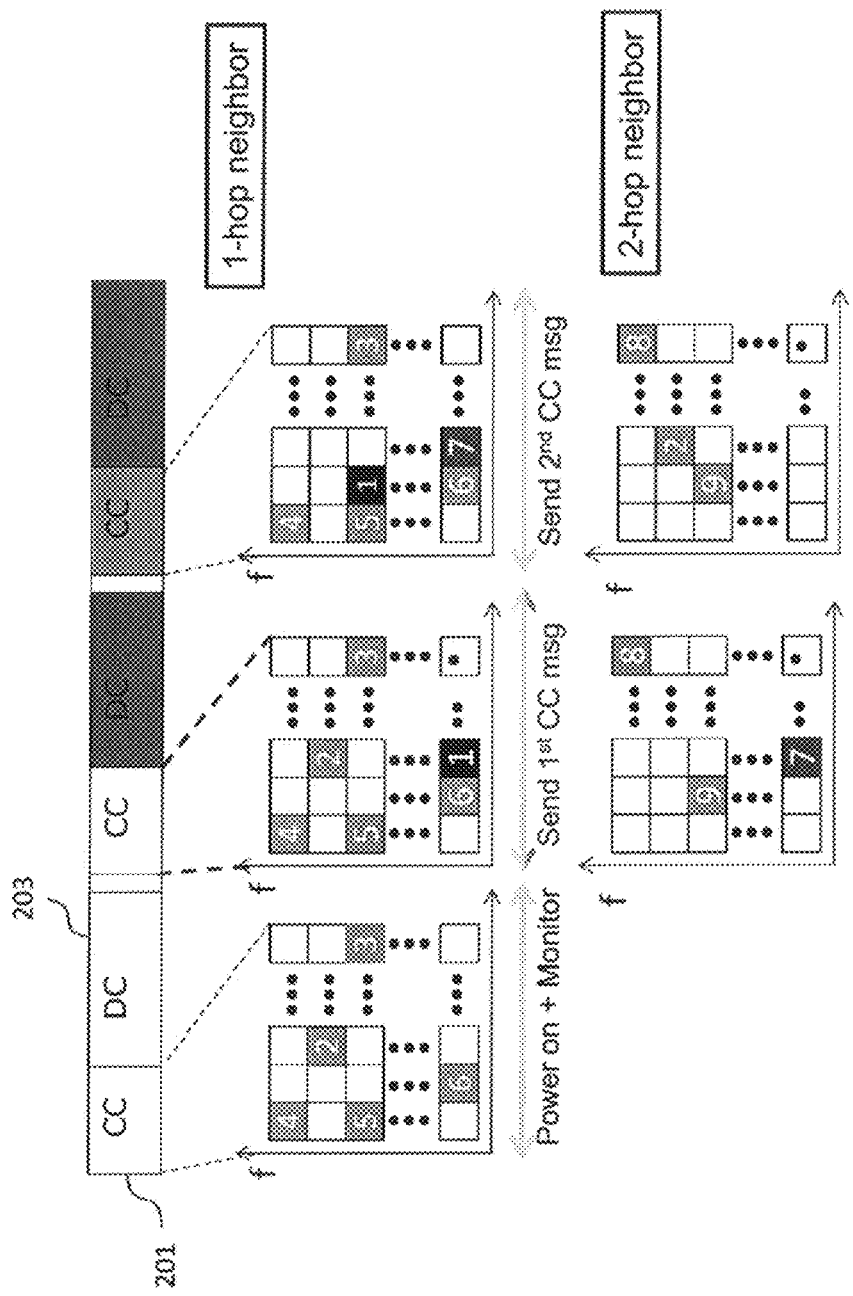
FIG. 8 shows a schematic diagram illustrating the allocation of communication resources by a communication device according to an embodiment.

The behavior of a communication device according to an embodiment in the context of a proactive communication resource re-selection is illustrated in FIG. 8. The communication device 101*a* receives a first radio frame to obtain information about its one hop neighbors V2 to V6 and their respective context information from the control channel 201 of the radio frame. In an embodiment, the communication device 101*a* is configured to obtain from the data channel 203 of the frame information about its two hop neighbors, for instance the two hop neighbors V7-9, and their context information from the broadcasting data of its one hop neighbors, as illustrated in the lower half of FIG. 8. In an embodiment, the communication device 101*a* is configured to select an available communication resource in the control channel 201 that is not already occupied by one of its one hop neighbors V2-6. The communication device 101*a* is also able to anticipate the new one-hop neighbor list for the next radio frame, where V2 will have left and V7 will have entered. In the exemplary case that V7 happens to use the same communication resource as the communication device 101*a*, the communication device 101*a* proactively randomly selects another available communication resource of the control channel 201. In an embodiment, also the communication device V7 can be configured to randomly select another available communication resource of the control channel 201.

FIG. 8 it is shown how V1 proactively selects another resource in order to avoid colliding with V7.

Embodiments of the invention reduce the interference and collisions for communication devices in highly mobile scenarios that communicate according to distributed TDMA schemes, such as in the case of STDMA or in the case of the approach described in PCT/EP2014/074742. Hence, the reliability of the exchange of messages between communication devices (including vehicular receivers) and the utilization of radio resources can be improved. This translates to an increased quality of service (QoS) for the applications relying on distributed TDMA, such as in the case of advanced driver assistance services (ADAS) under lack of cellular network assistance or lack of network coverage, in particular in comparison to SoTA V2X solutions IEEE 802.11p and STDMA.

Embodiments of the invention allow a context-aware distributed TDMA providing deterministic channel access probability for all transmitting communication devices, i.e. bounded channel access delay in comparison to 802.11p. In comparison to STDMA, embodiments of the invention are robust against fast changing interference (from fast variations of the VANET topology) by leveraging the context information.

Embodiments of the invention may be implemented in a computer program for running on a computer system, at least including code portions for performing steps of a method according to the invention when run on a programmable apparatus, such as a computer system or enabling a programmable apparatus to perform functions of a device or system according to the invention. A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

Although the invention is described with reference to specific features, implementation forms, and embodiments, it is evident that various modifications and combinations can be made thereto without departing from the spirit and scope of the invention. The description and the figures are, accordingly, to be regarded simply as an illustration of the invention as defined by the appended claims, and are contemplated to cover any and all modifications, variations, combinations, or equivalents that fall within the scope of the invention.

What is claimed is:

1. A communication device configured to receive context information, in particular position-based information or type-based information, from or about at least one other communication device and to configure a radio frame, in particular a control channel of a radio frame, based on the received context information;

wherein the radio frame comprises a plurality of communication resources and wherein the communication device is configured to configure the radio frame by allocating at least two groups of communication resources of the plurality of communication resources of the radio frame to at least two groups of communication devices of a plurality of other communication devices based on the context information;

wherein the communication device is further configured to broadcast the allocation of the plurality of communication resources of the radio frame into at least two groups based on the context information to the plurality of other communication devices such that a respective communication device of the plurality of other communication devices selects a communication resource of the plurality of communication resources of the radio frame from a group of the at least two groups of communication resources to which the respective communication device has been allocated.

2. The communication device of claim 1, wherein the communication device is configured to configure the radio frame by allocating the at last two groups of communication resources of the plurality of communication resources of the radio frame at least two groups of communication devices of the plurality of other communication devices based on a direction, a velocity and/or a position of at least one of the plurality of other communication devices and/or the density of the plurality of other communication devices.

3. The communication device of claim 1, wherein the communication device is further configured to dynamically adapt the allocation of the at least two groups of communication resources of the plurality of communication resources of the radio frame to the at least two groups of communication devices of the plurality of other communication devices based on the context information.

4. The communication device of claim 1, wherein the communication resources of a first group of communication resources of the at least two groups of communication resources of the plurality of communication resources of the radio frame are orthogonal to the communication resources of a second group of communication resources of the at least two groups of communication resources of the plurality of communication resources of the radio frame.

5. The communication device of claim 1, wherein the communication device is further configured to assign different priorities to the at least two groups of communication resources of the plurality of communication resources such that a respective communication device of the plurality of other communication devices selects a communication resource of the plurality of communication resources of the radio frame from a group of the at least two groups of communication resources according to the different priorities.

6. The communication device of claim 1, wherein the communication device is configured to configure the radio frame by allocating at least two groups of communication resources of the plurality of communication resources of the radio frame to at least two groups of communication devices of the plurality of other communication devices based on the context information periodically or event-driven.

7. The communication device of claim 6, wherein the communication device is configured to reselect a communication resource of the plurality of communication resources, in case the at least one other communication device, predicted by the communication device to have access to the same communication resources of the plurality of communication resources as the communication device within the prediction interval, has selected the same communication resource of the plurality of communication resources as the communication device within the prediction interval.

8. The communication device of claim 6, wherein the communication device is configured to predict based on the context information at least one other communication device of the plurality of other communication devices to have access to the same communication resources of the plurality of communication resources as the communication device by receiving from each other one-hop neighboring communication device the context information of the other one-hop neighboring communication device and the context information of the other communication devices of the plurality of other communication devices that are other one-hop neighboring communication devices of the other one-hop neighboring communication device.

9. The communication device of claim 1, wherein the communication device is configured to configure the radio frame by allocating at least two groups of communication resources of the plurality of communication resources of the radio frame to at least two groups of communication devices of the plurality of other communication devices based on the context information such that the number of communication resources within a group of the at least two groups of communication resources is proportional to the number of communication devices within a group of the at least two groups of communication devices of the plurality of other communication devices.

10. The communication device of claim 1, wherein the radio frame comprises a plurality of communication resources and wherein the communication device is configured to configure the radio frame by predicting based on the context information at least one other communication device of a plurality of other communication devices to have access to the same communication resources of the plurality of communication resources as the communication device within a prediction interval and by selecting a communication resource of the plurality of communication resources of the radio frame on the basis of the prediction for the prediction interval.

11. A method comprising:
receiving, by a communication device, context information including position-based information or type-based information, from at least one other communication device; and
configuring a control channel of a radio frame, based on the received context information;
wherein the radio frame comprises a plurality of communication resources and wherein the method further comprises:
configuring the radio frame by allocating at least two groups of communication resources of the plurality of communication resources of the radio frame to at least two groups of communication devices of a plurality of other communication devices based on the context information; and
broadcasting the allocation of the plurality of communication resources of the radio frame into at least two groups based on the context information to the plurality of other communication devices such that a respective communication device of the plurality of other communication devices selects a communication resource of the plurality of communication resources of the radio frame from a group of the at least two groups of communication resources to which the respective communication device has been allocated.

12. The method of claim 11, wherein configuring the control channel of the radio frame further comprises:
allocating the at last two groups of communication resources of the plurality of communication resources of the radio frame to at least two groups of communication devices of the plurality of other communication devices based on:
(a) a direction, a velocity and/or a position of at least one of the plurality of other communication devices; and/or
(b) the density of the plurality of other communication devices.

13. The method of claim 11, further comprising:
dynamically adapting the allocation of the at least two groups of communication resources of the plurality of communication resources of the radio frame to the at least two groups of communication devices of the plurality of other communication devices based on the context information.

14. The method of claim 11, wherein the communication resources of a first group of communication resources of the at least two groups of communication resources of the plurality of communication resources of the radio frame are orthogonal to the communication resources of a second group of communication resources of the at least two groups of communication resources of the plurality of communication resources of the radio frame.

15. The method of claim 11, further comprising:
assigning different priorities to the at least two groups of communication resources of the plurality of communication resources, so as to enable a respective communication device of the plurality of other communication devices to select a communication resource of the plurality of communication resources of the radio frame from a group of the at least two groups of communication resources according to the different priorities.

16. The method of claim 11, further comprising:
configuring the radio frame by allocating at least two groups of communication resources of the plurality of communication resources of the radio frame to at least two groups of communication devices of the plurality of other communication devices based on the context information periodically or event-driven.

17. The method of claim 16, further comprising:
reselecting a communication resource of the plurality of communication resources, when the at least one other communication device predicted by the communication device has selected the same communication resource of the plurality of communication resources as the communication device within the prediction interval.

18. The method of claim 16, further comprising:
predicting, based on the context information, at least one other communication device of the plurality of other communication devices to have access to the same communication resources of the plurality of communication resources as the communication device by receiving from each other one-hop neighboring communication device the context information of the other one-hop neighboring communication device and the context information of the other communication devices of the plurality of other communication devices that are other one-hop neighboring communication devices of the other one-hop neighboring communication device.

19. The method of claim 11, further comprising:
configuring the radio frame by allocating at least two groups of communication resources of the plurality of communication resources of the radio frame to at least two groups of communication devices of the plurality of other communication devices based on the context information such that a quantity of communication resources within a group of the at least two groups of communication resources is proportional to a quantity of communication devices within a group of the at least two groups of communication devices of the plurality of other communication devices.

20. The method of claim 11, wherein the radio frame comprises a plurality of communication resources; and wherein the method further comprises:
configuring the radio frame by predicting based on the context information at least one other communication device of a plurality of other communication devices to have access to the same communication resources of the plurality of communication resources as the communication device within a prediction interval and by selecting a communication resource of the plurality of communication resources of the radio frame on the basis of the prediction for the prediction interval.

* * * * *